Feb. 15, 1949.  H. J. READ  2,462,002
CUTTING TIP FOR CUTTING TOOLS
Filed July 25, 1945

INVENTOR.
Harold J. Read
BY
J. Stanley Churchill
atty.

Patented Feb. 15, 1949

2,462,002

UNITED STATES PATENT OFFICE 2,462,002

CUTTING TIP FOR CUTTING TOOLS

Harold J. Read, Pittsburgh, Pa., assignor to H. H. Robertson Company, Pittsburgh, Pa., a corporation of Pennsylvania Application July 25, 1945, Serial No. 607,036

1 Claim. (Cl. 29—95)

This invention relates to a cutting tip for a cutting tool.

The invention has for an object to provide a novel construction of cutting tip for a cutting tool which may be secured to the shank or holder of the cutting tool in a novel simple economical and most convenient manner.

With this general object in view and such others as may hereinafter appear the invention consists in the cutting tip for a cutting tool hereinafter described and particularly defined in the claim at the end of this specification.

Figure 1:
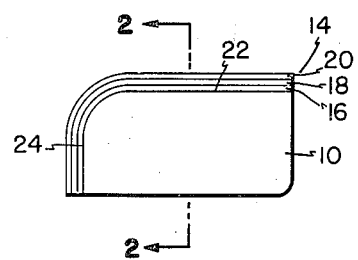
Figure 2:
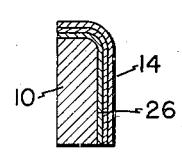
Figure 3:
Figure 4:
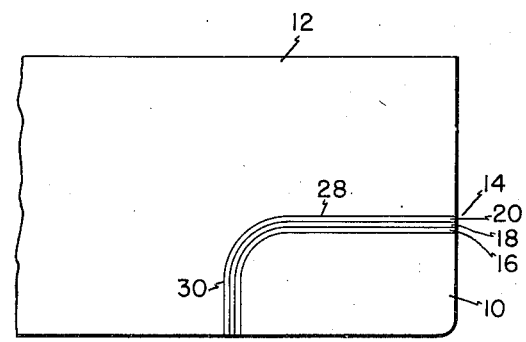
Figure 5:
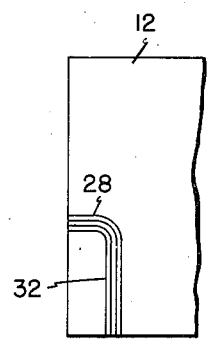
Figure 6:
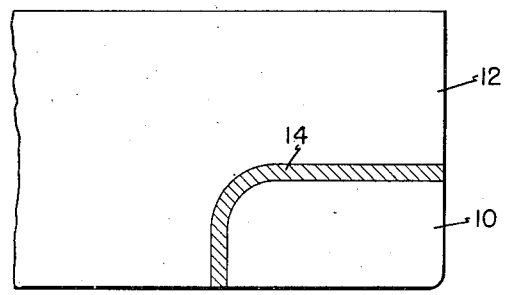

In the drawings I have illustrated the present invention as embodied in a cutting tip for a cutting tool wherein Fig. 1 is a front elevation of the present cutting tip coated with a plurality of layers of metal adhesive, the layers being shown greatly enlarged for purposes of illustration; Fig. 2 is a cross-section taken in the line of 2—2 in Fig. 1; Fig. 3 is a view of a cutting tip entirely coated with successive layers of fusible metal adhesive such as produced by electroplating; Fig. 4 is a side elevation of the present cutting tip assembled in operative position in the metal body of the tool holder prior to the heating operation; Fig. 5 is an end view of the same and Fig. 6 is a view similar to Fig. 4 showing the tip secured to the tool body after the heating operation.

In general the present invention contemplates a cutting tip for a cutting tool provided with a thin coating of fusible metal adhesive to form a unitary part thereof. Such a cutting tool may be assembled in operative position upon the main body of the usual tool holder and subjected to heating to be readily secured to the tool body by the metal adhesive. The metal adhesive coating may be applied to those surfaces of the cutting tip which are intended to contact with surfaces of the tool holder but it is preferred to coat the cutting tip all over with the metal adhesive. In practice the metal adhesive may comprise a brazing alloy and it is preferred to apply the component metals of the brazing alloy or metal adhesive successively to provide the cutting tip with a plurality of superimposed metal layers and then after assembly of the cutting tip upon the tool body subjecting the tip and tool body to heating thereby effecting the alloying of the metal layers to form a brazing alloy and simultaneously securing the tip to the tool body by the brazing alloy thus formed.

Heretofore, when two or more metal articles have been united by brazing, soldering, or similar operations utilizing a fusible metal adhesive, the brazing alloy or other fusible metal adhesive has been utilized in the form of a sheet, rod, or wire which is interposed between the surfaces of the metal articles to be united, and then the assembly has been subjected to heat while maintaining the surfaces of the articles being united pressed against one another, the necessary fluxes being used in accordance with the well-known standard practice.

In many instances the accessibility, shape and particular character of the articles or surfaces thereof being thus united by the fusible metal adhesive have presented problems with respect to the introduction of the metal adhesive in a solid form, as a sheet or wire, in a place where limited room for proper manipulation existed. In some other instances, as for example in the brazing of cemented carbide tool tips to steel or iron shanks or holders, the technique recommended to be employed involves the cutting of small pieces of the brazing alloy from a sheet thereof and the fitting of the individual pieces between the surface of the tip and the surface of the shank or holder to which it is to be secured by the brazing operation. In the case of the more complicated multi-point tools the practice which has been followed involves wiring together the several carbide tips and their accompnaying sheets or pieces of sheet brazing alloy in place, prior to subjecting the assembly to heating. This procedure has required patience, time, and involves a rather high degree of manipulative technique in order to effect a satisfactory and desirable brazed joint between the tips and the shank or tool holder.

In accordance with the preferred method of producing the present cutting tip and the application thereof to the metal body of the tool holder I first attach a thin layer of fusible metal adhesive and preferably a brazing alloy to those surfaces of the cutting tip which are intended to contact the surfaces of the shank of the tool holder. This thin layer may be applied to such surfaces by various methods including the electrodeposition of the desired metal alloy, by spraying methods using oxy-acetylene or electric arc guns, by methods similar in nature to sheradizing, galvanizing or hot dip tinning. In practice I prefer to coat the cutting tip all over with successively applied thin layers each layer comprising a component metal of the fusible metal adhesive preferably with the component metals in an unalloyed condition. Conveniently these layers may be applied by electroplating successive layers of the component metals on the outer surface of the cutting tip. The next step in the operation of securing the cutting tip to the body of the tool holder contemplates maintaining the cutting tip in contact with and firmly pressed against an adjacent surface of the tool body and then subjecting both the cutting tip and tool body to heating, preferably to a temperature sufficient to effect alloying of the metallic components of the brazing alloy or other fusible metal adhesive. In this manner the single heating operation serves not only to form the metal adhesive but also to effect the adhesion of the metal adhesive to both surfaces being united. In the event that the surface of the cutting tip is coated as above described with metal adhesive instead of with successive layers of unalloyed components thereof, then upon subsequent heating fusion of the metal adhesive takes place and upon cooling the desired uniting of the surfaces is effected.

Referring now to the drawings, I have illustrated the invention as applied to a method of uniting cemented carbide cutting tips 10 to the steel or iron shanks or holders 12 by brazing. The brazing alloy 14 may comprise any usual or preferred copper-base brazing alloy such for example as an alloy of copper 16, zinc 18 and silver 20. The brazing alloy is in accordance with the present invention secured to the surface or surfaces 22, 24, 26 of the cemented carbide tool tip which are to contact with corresponding surfaces 28, 30, 32 in the usual recess at the end of the iron or steel shank or holder 12 of the cutting tool, and the successive layers of copper, zinc and silver are applied by any of the above described methods, but preferably by being electroplated by any usual or convenient electroplating method and equipment until the total thickness of the layers approximates .004 of an inch or thereabouts. Because of the fact that zinc tends to alloy with iron to form a brittle iron-zinc alloy, it is preferred to plate the copper, zinc and silver upon these cemented carbide tips in the sequence or order named so that the zinc is maintained out of direct contact with the iron. After the tip has been thus plated, it is assembled in its operative position in the tool holder so that the plated surfaces engage and are pressed against the corresponding surfaces in the notch of the tool holder and then both are subjected to heat to a temperature sufficient to effect the alloying of the copper, zinc and silver to form a brazing alloy and to cause the adhesion of the brazing alloy to surfaces of the metal shank or tool holder against which the cemented tip has been pressed. It is necessary and desirable to use fluxes during the brazing operation and any suitable commercial flux in either the form of a powder, a thick paste or a thin paste, or liquid, depending upon the particular character of tip and tool holder and the preference of the operator who is to perform the brazing operation. Ordinarily, thick pastes are usually preferred in accessible locations and thin pastes or liquids in those which are relatively inaccessible. The flux may be applied either to the coated cemented carbide tip or to the surface or surfaces to which the tip is to be secured, or to both.

In heating the tip to the tool holder, it is desirable to follow the practice and technique now used in brazing cemented carbide tips to tool holders at the present time. Uniformity in the distribution of the heat is essential, and the procedure of slowly cooling the tip after the brazing operation by burying the tool in powdered charcoal, graphite, asbestos, mica, or lime and not by quenching is recommended.

The present invention when embodied in a cutting tip of the hard alloy or cemented carbide type enables such tips to be secured in their operative positions upon the shank of the tool in a simple convenient and most economical manner eliminating to a large extent difficulties in assembling technique which have heretofore been experienced in the application of prior cutting tips to such shanks. When the tip is coated with the successively applied unalloyed component metals of the metal adhesive the alloying takes place in situ with the tip fitted into the notch in the shank or tool holder so that a desirable and strong brazed or equivalent joint is produced.

The composition of the alloy resulting from the heating operation may be controlled with satisfactory accuracy by control of the thicknesses of the applied metal layers, and the number, composition, thickness and order of application of the layers of metal must certainly be subject to wide variation. The combinations of copper-zinc, silver-zinc, silver-zinc-copper, silver-zinc-cadmium-copper are all the bases for good brazing alloys, and there are probably others which should also serve. The proportions of metals in these and hence the relative thickness of the metal layers may be varied within wide ranges. An example of a satisfactory combination and thickness is given above.

Having thus described the invention, what is claimed is:

A hard cutting tip adapted for attachment to the body of the cutting tool having those surfaces thereof which are intended to contact with surfaces of the tool holder coated with at least three metal layers each layer comprising a component of a multi-metal adhesive, an intermediate layer comprising zinc, said metal layers being capable of alloying in situ under the action of heat during the operation of affixing the cutting tip to the body of the cutting tool.

HAROLD J. READ.

REFERENCES CITED

The following references are of record in the file of this patent:

UNITED STATES PATENTS

| Number | Name | Date |
|--------|------|------|
| 1,043,831 | Heinkel et al. | Nov. 12, 1912 |
| 1,524,218 | Smith et al. | Jan. 27, 1925 |

FOREIGN PATENTS

| Number | Country | Date |
|--------|---------|------|
| 713,475 | France | Oct. 28, 1931 |